United States Patent
Hauser

(10) Patent No.: US 8,201,160 B2
(45) Date of Patent: Jun. 12, 2012

(54) DATA PROCESSING METHOD AND SYSTEM

(75) Inventor: Rainer F. Hauser, Thalwil (CH)

(73) Assignee: International Business Machines Corporation, Armonk, NY (US)

( * ) Notice: Subject to any disclaimer, the term of this patent is extended or adjusted under 35 U.S.C. 154(b) by 1209 days.

(21) Appl. No.: 11/481,372

(22) Filed: Jul. 5, 2006

(65) Prior Publication Data

US 2007/0018986 A1    Jan. 25, 2007

(30) Foreign Application Priority Data

Jul. 5, 2005 (EP) .................................. 05014520

(51) Int. Cl.
*G06F 9/45* (2006.01)
(52) U.S. Cl. ........................................... 717/156
(58) Field of Classification Search .......... 717/141–144, 717/155–157; 709/225, 206; 705/7; 718/105; 714/38
See application file for complete search history.

(56) References Cited

U.S. PATENT DOCUMENTS 7,136,899 B1 *  11/2006  Campailla ..................... 709/206

OTHER PUBLICATIONS

Hecht et al, "Flow Graph Reducibility", Proceedings ACM Symposium on Theory of Computing, 1972, pp. 238-250 <flowgraph_hecht.pdf>.*
Curbera et al, "Business Process Execution Language for Web Services" Ver 1.1, May 2003, pp. 1-136 <BPEL_v1.1_503.pdf>.*
Ammarguellat Zahira, "A Control-Flow Normalization Algorithm and its Complexity", Jul. 1992, pp. 1-40 <CF_Ammarguellat.pdf>.*
"Compiling Process Graphs into Executable Code", Proc. 3rd International Conference on Generative Programming and Component Engineering, Hauser, et al, pp. 317-336, GPCE 2004.
"Flow Graph Reducibility", Hecht, et al, Siam J. Comput. vol. 1 No. 2, pp. 188-202, 1972.
"Handling Irreducible Loops: Optimized Node Splitting versus DJ-Graphs", Unger, et al, ACM Transactions on Programming Languages and Systems, 24(4), pp. 299-333, Ju, TOPLAS Jul. 2002.

* cited by examiner

*Primary Examiner* — Tuan Anh Vu
(74) *Attorney, Agent, or Firm* — William Stock; Anne Vachon Dougherty

(57) ABSTRACT

A data processing method including receiving a model of a directed graph, the model defining one or more nodes and edges of the directed graph, each node having a corresponding behavior defining the execution of the node, and each edge having corresponding data defining a directional link from one node to another node and having a corresponding condition defining when the edge is to be traversed; executing, according to a predefined priority, a series of transformation rules, the transformation rules comprising a first rule for the elimination of an edge that links a node to itself, and a second rule for the elimination of an edge that links a node to another node, each rule including an update operation defining a new behavior for the or each node affected by the elimination of the edge; and creating an output according to the performance of the transformation rules.

15 Claims, 7 Drawing Sheets

DATA PROCESSING METHOD AND SYSTEM

FIELD OF THE INVENTION

This invention relates to a data processing method and system and to a computer program product on a computer readable medium. The data processing method can be used for processing models of directed graphs, for example, transforming unstructured cycles to structured cycles in sequential flow graphs.

BACKGROUND OF THE INVENTION

A directed graph has the following properties, firstly the graph has one start node $n_s$, i.e., a node without incoming edges, also called the initial node. Secondly, the graph has one termination node $n_t$, i.e., a node without outgoing edges, also called the end or final node, and thirdly the graph fulfils the restriction that for all nodes n there exists a path from $n_s$, to n and a path from n to $n_t$, i.e., all nodes are reachable from the start node and can reach the termination node. A model of a directed graph is used in several related technical fields, for example, it is common to represent the architecture of a computer program as a flowchart, which is an example of a directed graph. Likewise business plans can also be represented as directed graphs.

The trend towards model-driven architecture and development, graphical modelling languages such as the Universal Modelling Language (UML) gain importance, as can be seen from the many new packages added to UML from its early days to its latest version, Version 2.0. The package for activity diagrams is such an extension for dynamic behavior.

UML 2.0 activity diagrams, like many other graphical modelling languages for business processes and workflows, use one or another form of flow graphs (directed graphs) and model a behavior with nodes and edges, where nodes represent activities and edges model the potential continuations from one activity to other activities. An edge can be seen as a visual representation of a "goto" as available in some programming languages.

Flow graphs can become cyclic when certain activities are executed more than once in a single run of the behavioral model. These cycles are called unstructured to distinguish them from the well-structured cycles modelled as explicit "while" or "repeat" loops. If unstructured cycles in business process or workflow models shall be eliminated and replaced by structured constructs, cycle-removal algorithms can be applied.

One area where cycle-removal algorithms are used is the field of transformations from a source metamodel that allows unstructured cycles to a target metamodel that only allows structured constructs. An example of such a transformation is the compilation of UML 2.0 activity diagram models to the Business Process Execution Language for Web Services (BPEL4WS). Another area where cycle-removal algorithms are useful is the management of complexity, where they can help analyze large flow graphs in order to understand the intended behavior. As in structured programming, structured loops are easier to understand than unstructured cycles.

Different algorithms can be used to remove cycles in sequential flow graphs, two are discussed in Hauser, R., Koehler, J. "Compiling Process Graphs into Executable Code", Proc. 3rd International Conference on Generative Programming and Component Engineering, LNCS 3286, pp. 317-336, Vancouver, Canada, October 2004. The state-machine-controller method interprets the nodes as states and the edges as transitions. It executes the activities in a single while-loop and keeps track of what the next activity is going to be. This method can be applied to any flow graph. The goto-elimination-method on the other hand extracts the intended cycle-structure and replaces the cycles found with structured cycles. This method can only be applied, without additional aids, to flow graphs that are well-structured enough.

The connectedness of nodes in a flow graph with several nodes is a kind of measure for how well-structured the flow graph is. An acyclic graph is well-structured and can be transformed into a structured program with if-statements. If more edges are added, then, at a certain point in time, the flow graph becomes cyclic. The flow graph is still well-structured and can be transformed into a structured program with if-statements and one repeat-loop. As progressively more edges are added, the flow graph evolves until it eventually becomes unstructured. When every node has an edge leading to every other node, the flow graph has become completely unstructured and can be traversed in any possible way. Any set of nodes with two or more nodes contains cycles.

Compiler theory introduced the concept of reducibility to define when a flow graph is well-structured. The T1-T2 analysis is one algorithm to determine whether a flow graph is reducible. This was first detailed in the paper Hecht, M. S., Ullman, J. D.: "Flow Graph Reducibility", SIAM J. Comput. Vol. 1 No. 2, pp. 188-202, 1972. The concept of reducibility has proven valuable over the past three decades as goto-elimination in programming languages can only be applied to programs whose control flow graph is reducible. If a flow graph is irreducible, auxiliary methods such as node-splitting can be applied to regain reducibility, but the consequence is that nodes, i.e., pieces of code, are duplicated and this is not always desirable. Since node-splitting increases the size of a flow graph, techniques have been suggested for the optimal strategy to split the nodes, e.g. as described in: Unger, S., Mueller, F.: "Handling Irreducible Loops: Optimized Node Splitting versus DJ-Graphs", ACM Transactions on Programming Languages and Systems, 24(4), pp. 299--333, July 2002.

SUMMARY OF THE INVENTION

It is therefore an object of the invention to improve upon the known art. According to a first aspect of the invention, there is provided a data processing method comprising the steps of receiving a model of a directed graph, the model defining one or more nodes and edges of the directed graph, each node having a corresponding behavior defining the execution of the node, and each edge having corresponding data defining a directional link from one node to another node and having a corresponding condition defining when the edge is to be traversed; executing, according to a predefined priority, a series of transformation rules, the transformation rules comprising a first rule for the elimination of an edge that links a node to itself, and a second rule for the elimination of an edge that links a node to another node, each rule including an update operation defining a new behavior for the or each node affected by the elimination of the edge, and creating an output according to the performance of the transformation rules.

According to a second aspect of the invention, there is provided a data processing system comprising a processor, a display device and one or more user input devices, the processor arranged to receive a model of a directed graph, the model defining one or more nodes and edges of the directed graph, each node having a corresponding behavior defining the execution of the node, and each edge having corresponding data defining a directional link from one node to another node and having a corresponding condition defining when the edge is to be traversed, execute, according to a predefined priority, a series of transformation rules, the transformation rules comprising a first rule for the elimination of an edge that links a node to itself, and a second rule for the elimination of an edge that links a node to another node, each rule including an update operation defining a new behavior for the or each node affected by the elimination of the edge, and create an output according to the performance of the transformation rules.

According to a third aspect of the invention, there is provided a computer program product, on a computer readable medium, for operating a data processing system, comprising instructions for receiving a model of a directed graph, the model defining one or more nodes and edges of the directed graph, each node having a corresponding behavior defining the execution of the node, and each edge having corresponding data defining a directional link from one node to another node and having a corresponding condition defining when the edge is to be traversed, executing, according to a predefined priority, a series of transformation rules, the transformation rules comprising a first rule for the elimination of an edge that links a node to itself, and a second rule for the elimination of an edge that links a node to another node, each rule including an update operation defining a new behavior for the or each node affected by the elimination of the edge, and creating an output according to the performance of the transformation rules.

Owing to the invention, it is possible to provide a data processing method and system that can process models of directed graphs using transformation rules that work on patterns within the model, with a strategy that is able to be adjusted according to the desired result.

Two transformation rules are utilised, called L and C, which can be applied in any order to any model of a directed graph in order to produce a structured program that is functionally equivalent. For rule C, there are three specializations in order to guide the transformation by selecting priorities for the different specialised rules. This leads to more fine-grained control over the result of the transformation and allows the transformation to be optimized for specific needs.

The transformation algorithm is based on rules. A rule has a left side, i.e., a pattern, and a right side, i.e., an update operation. If the pattern of a rule matches, the model is updated according to the update operation. The patterns of all rules of the algorithm comprise one edge with its source node and its target node.

The method allows the transforming of unstructured cyclic models to functionally equivalent specifications having only structured cycles, which is crucial for automatically deploying graphical business process or workflow models, e.g., in the form of Universal Modeling Language (UML) activity diagrams, to an underlying platform based on a structured programming language, e.g., the Business Process Execution Language for Web Services (BPEL4WS). The present invention is based on the two simple transformation rules and can be applied to any sequential model without node-splitting in case of irreducibility.

The method for transforming unstructured continuations in sequential behavioral models to structured constructs can be applied to textual models (e.g., goto-elimination in programs for various programming languages such as C and Lisp), graphical models, (e.g., cycle-removal in models for workflow or business process modelling languages such as UML2 Activity Diagrams or WBI Modeller Projects), and combinations thereof. The method can be implemented as an update transformation that modifies the input model and returns the transformed input model as its result, or as a transformation that creates a new output model as its result.

Either the output of the data processing method will be structured in the same format as that of the received model, or the output of the data processing method will be structured in a different format from that of the received model. Depending upon the requirements of the user, the output can be presented as a model of a directed graph in the same format as was processed, so a model defined in a programming language can be outputted as a new model in that language, or the format can be changed so that the output could be a graphical representation for example.

Preferably, the transformation rules further include a third rule ($C_{st}$) for the elimination of an edge that links a node to another node, if and only if the source node has only one outgoing edge and the target node has only one incoming edge, a fourth rule ($C_s$) for the elimination of an edge that links a node to another node, if and only if the source node has only one outgoing edge, and a fifth rule ($C_t$) for the elimination of an edge that links a node to another node, if and only if the target node has only one incoming edge. The operation of these rules is described in more detail below, but the provision of the additional rules greatly increases the flexibility of the data processing method, and the priority of the rules (the order in which they are used to process the model) is used to optimise the end result depending upon the desired use of the output of the method.

BRIEF DESCRIPTION OF THE DRAWINGS

Embodiments of the present invention will now be described, by way of example only, with reference to the accompanying drawings, in which.

DETAILED DESCRIPTION OF THE INVENTION

Figure 1:
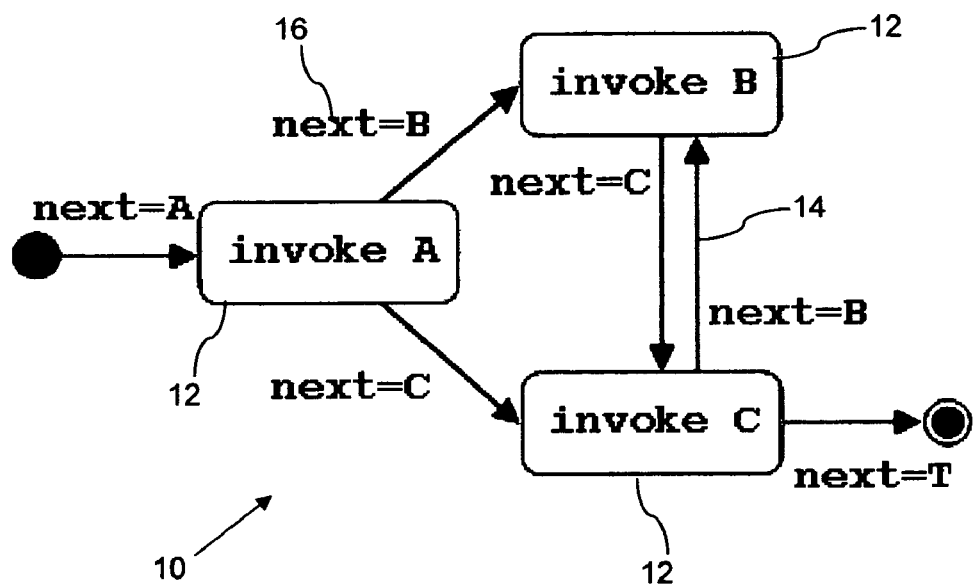
FIG. 1 is a schematic drawing of a directed graph.

FIG. 1 shows a simple directed graph 10, comprised of nodes 12 and edges 14. The graph 10 in FIG. 1 is shown graphically, but can equally be represented in a large number of different ways, such as a list of nodes 12 and edges 14, or, in the case of specific programming and modelling languages, as a series of terms as defined by those languages. Any such representation can be considered to be a model of a directed graph.

In order to represent business processes and workflows, the standard definition of a flow graph is extended. Firstly, a node 12 is assumed to be annotated with a behavior which defines the execution of the node 12. The behavior will be described with a behavioral metamodel, but a simple string representation will be used for compactness of the representation. The behavior of node A in FIG. 1 is written as invoke A.

Secondly, to every edge 14 a condition 16 called a guard is assigned such that the guards of all edges leaving a node are mutually exclusive and exhaustive. The guards 16 state which edge 14 will be fired by the node 12 when the execution of the node 12 terminates. The condition 16 defines when an edge 14 is to be traversed.

The guards 16 in a flow graph are originally expressions over variables within the scope of a node 12 that tests whether the guards 16 are true. Because the setting of these variables and the tests may become separated during any transformation, additional variables are introduced and maintained in order to keep the intended execution logic correct.

In an initial transformation step a single variable, called "next" is introduced, in the scope of all nodes in the flow graph, i.e., readable and writable by all nodes. It is used to store the next node to be executed. Secondly, the initial behavior invoke N for a node N is replaced by

```
invoke N;
if (c1) { next := N1 }
...
if (cn) { next := Nn }
``` where ci is the original guard of the edge N->Ni (for i=1 to n). Lastly, the initial guard ci for every edge N->Ni is replaced with next=Ni. The simple schema in the initial transformation step uses the variable next to store the goto-target. More elaborate schemes are possible.

The processing of any model of a directed graph comprises the executing, according to a predefined priority, of a series of transformation rules. The two transformation rules are based on a pattern that comprises an edge M->N with its source node M and its target node N. A first rule is for the elimination of an edge that links a node to itself and is called L, and the second rule for the elimination of an edge that links a node to another node and is called C. The second rule C merges two nodes and simultaneously removes one or more than one edge. Because a flow graph contains only a finite number of nodes and edges and each rule removes at least one edge, the execution of the rules eventually terminates. The result is a flow graph with a single node and no edges, because otherwise one of the rules could still be applied.

The application of a rule in a transformation step modifies the flow graph by merging nodes and removing edges, updates the behavior of nodes, and may change the guard of edges. The result of the transformation is the behavior of the single remaining node when the rules can no longer be applied.

Figure 2:
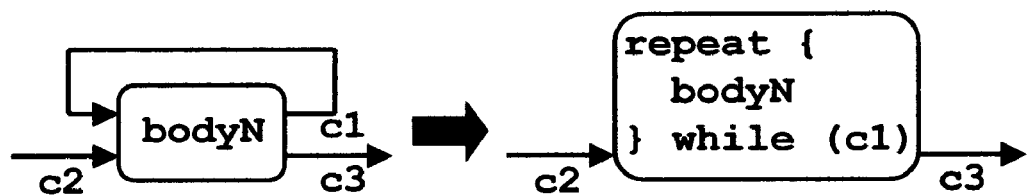
FIG. 2 is an example of the transformation of a simple directed graph according to a first rule.

FIG. 2 depicts the transformation rule L, which is applicable to an edge M->N if M=N. The self-loop with guard c1 is removed and the node with behavior bodyN has its behavior modified during the transformation step. The behavior of node N is wrapped into a repeat-loop with the guard of the removed edge as its loop-condition. All other edges of node N remain unchanged. This rule is responsible for introducing loops into the behaviors of the nodes.

Figure 3:
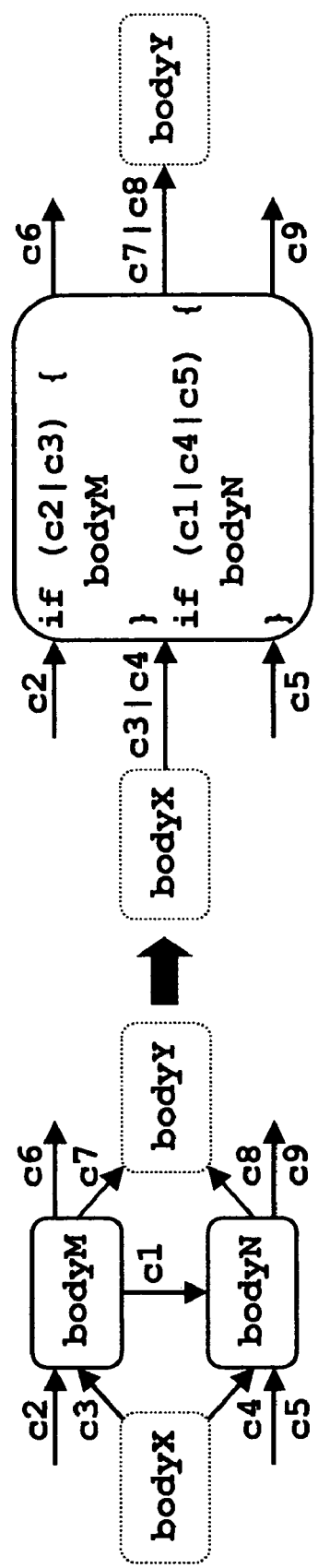
FIG. 3 is an example of the transformation of a simple directed graph according to a second rule.

FIG. 3 depicts the transformation rule C, which is applicable to an edge M->N if M not=N. The nodes M and N with respective behaviors bodyM and bodyN are merged during the transformation step, the edge leading from M to N is removed, and the other edges with their guards are adapted appropriately. The behavior of the resulting node executes bodyM only if c2|c3 (the disjunction of all guards of incoming edges of M) is true while bodyN is executed only if c1|c4|c5 (the disjunction of all guards of incoming edges of N) is true. The symbol | used in the text and figures, represents the logical or.

The new node, produced in FIG. 3, inherits all incoming and outgoing edges of M and N except for the removed edge. The guards of incoming and outgoing edges remain unchanged except if both nodes originally had an edge from or to a third node (here nodes X and Y), the two edges are merged and their guards are combined with a disjunction. This rule is responsible for introducing conditionals into the behavior of the nodes.

Rule C wraps the original behavior of both nodes into if-statements. This is not always necessary, because if the source node has only one outgoing edge or the target node has only one incoming edge, then this edge is the edge that will be removed by the transformation step.

A more flexible strategy for processing the model of the directed graph can be achieved using further additional rules (the order in which rules are applied to a model is discussed in detail below). Three further rules are discussed, each of which is a specialization of rule C.

Figure 4:
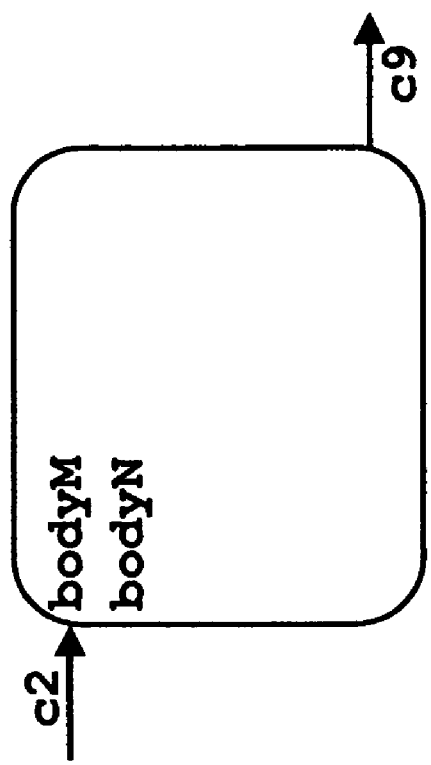
FIG. 4 is an example of the transformation of a simple directed graph according to a third rule.
Figure 4:
Figure 4:
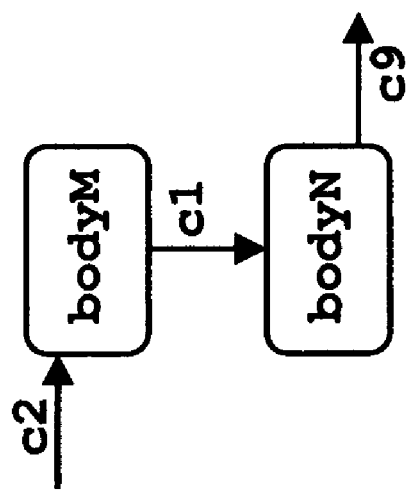

A third rule Cst is shown in operation in FIG. 4. This rule is applicable when the two nodes M and N build a simple sequence. No if-statement is therefore necessary. The third rule is for the elimination of an edge that links a node to another node, if and only if the source node has only one outgoing edge and the target node has only one incoming edge.

Figure 5:
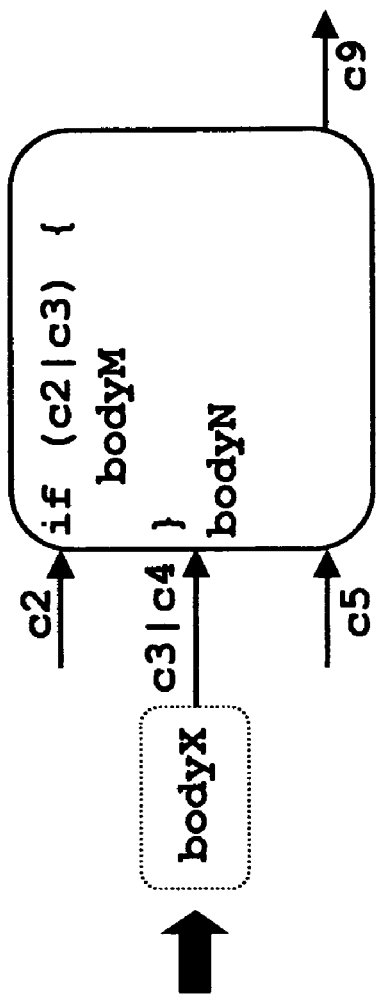
FIG. 5 is an example of the transformation of a simple directed graph according to a fourth rule.
Figure 5:
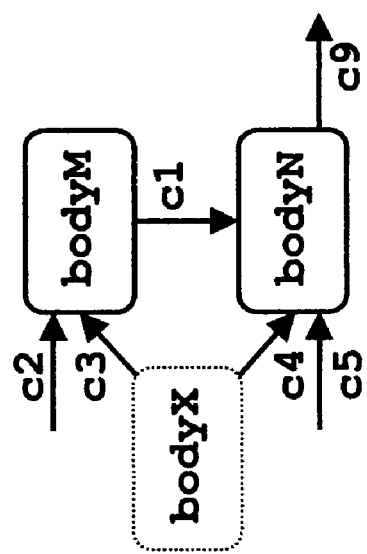

A fourth rule Cs, shown in FIG. 5, is applicable if node M has only one outgoing edge, the edge M->N. The guard of this edge is always true, and the second if-statement is not necessary, because bodyN is executed when the merged node is reached. The fourth rule Cs is for the elimination of an edge that links a node to another node, if and only if the source node has only one outgoing edge.

Figure 6:
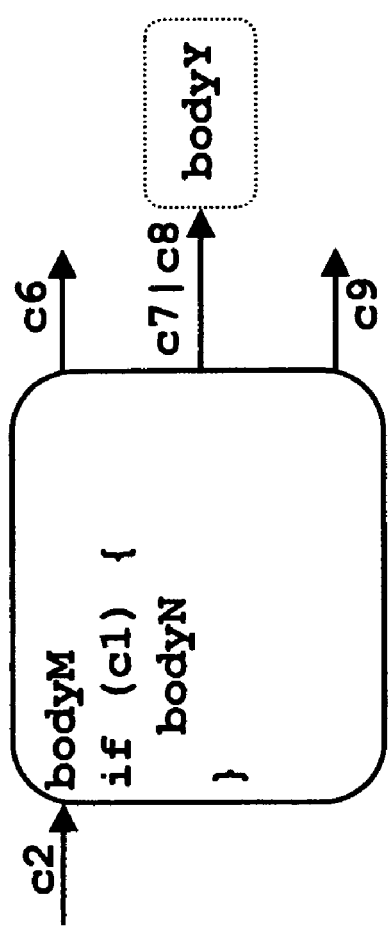
FIG. 6 is an example of the transformation of a simple directed graph according to a fifth rule.
Figure 6:
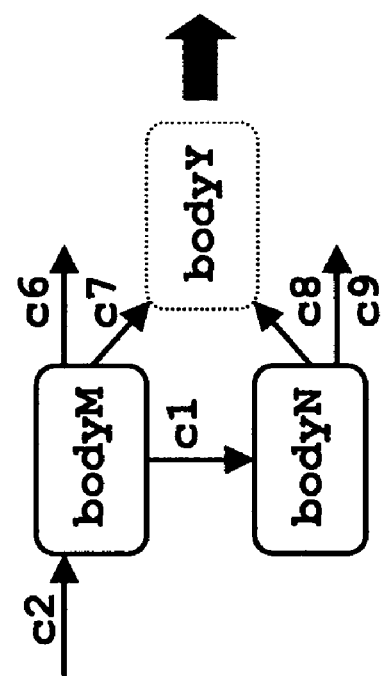

A fifth rule rule Ct, shown in FIG. 6, is applicable if node N has only one incoming edge, the edge M->N. Node N is only reachable through node M and the first if-statement is therefore not necessary. The fifth rule Ct is for the elimination of an edge that links a node to another node, if and only if the target node has only one incoming edge.

The conditions in guards and if-statements can often be simplified. When a node has only one outgoing edge, the guard is true and can be eliminated. Further, the transformation rules may lead to disjunctions such as next=N|next=N that contain the same term more than once and can be simplified. In the discussion below, to keep behaviors compact, terms such as next=A|B will be used instead of next=A|next=B.

The behavior of the flow graph is not changed through the introduction of the variable next in the initial transformation step. Likewise, the data processing method will produce an output that is functionally equivalent to the original flow graph. This can be shown by demonstrating that the rules L and C preserve the behavior of the original nodes as they are executed.

For all transformation rules the guards of all outgoing edges of a new node are still mutually exclusive and exhaustive. They may no longer form a tautology because one edge is removed by L, but its guard can never be true after the repeat-loop.

The transformation rules L and C (and the variations of C) do not change the execution logic of any transformed node(s). The proof for rule L is straightforward because the guards of the outgoing edges, i.e., the conditions c1 and c3 in FIG. 2, stay correct for the old and the new behavior and these guards are mutually exclusive. The proof for C shows that the behavior of the new node is correct, that the guards of the incoming edges cannot trigger unintended behavior inside the new node, and that the behavior of the new node cannot enable the guards of the wrong outgoing edges, i.e., the conditions c6 to c9 in FIG. 3. The first two points are obvious and the last point is guaranteed because the guard of an edge A->B can only contain a disjunction of terms next=ci where each ci is either B or has been merged in a previous step into B. A node is never merged into more than one node.

Figure 7:
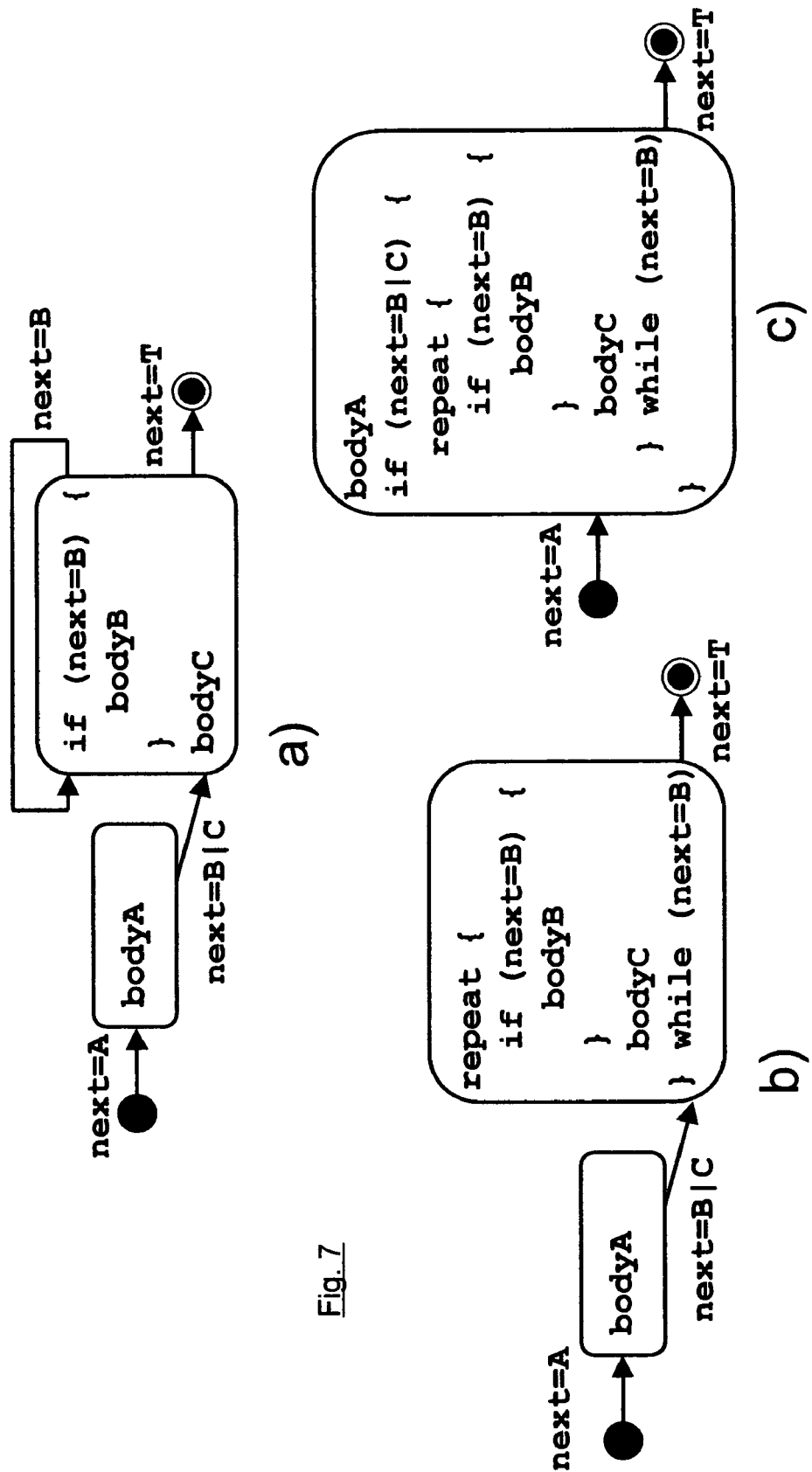
FIG. 7 shows the transformation of the directed graph of FIG. 1, as specific transformation rules are executed.

An example of the effect of the data processing method is now described with respect to FIG. 7, which shows one possible implementation where the input is a graphical model, the output a textual model, and the result is produced by an update transformation. This has been selected because one important application of the transformation is the removal of cycles in the graphical representation of business process models in order to compile them into the Business Process Execution Language for Web Services, called BPEL4WS or simply BPEL.

FIG. 7 shows the transformation, with the rules L, Cs and Ct applied to the flow graph of FIG. 1 after the initial transformation step to set and use the newly introduced variable next. In a first step, application of rule Cs merges node B with C and leads to the flow graph with a self-loop in FIG. 7a. The self-loop is eliminated next using rule L as shown in FIG. 7b where the repeat-loop replaces the self-loop. In the last step resulting in FIG. 7c, rule Ct is applied to demonstrate how the guard of the edges are used. Cst could have been applied instead to avoid the unnecessary if-statement with condition next=B|C.

To complete the transformation, the initial node can be removed and becomes the initialization, and the final node disappears completely into implicit termination. If there would have been more than one edge leaving the initial node, the initialization would have become a set of if-statements that initialize the variable next. If the final node is resolved last, only a single edge remains in the flow graph and rule Cst can be applied. It is clear that the empty behavior of the final node has no influence on the program. Terms next=T never appear in conditions of if-statements or repeat-loops.

The complete program for the flow graph in FIG. 1 is (with conditions that are always true removed):

```
next := A
invoke A
if (AB) {next := B}
if (AC) {next := C}
repeat {
   if (next = B) {
      invoke B
      next := C
   }
   invoke C
   if (CB) {next := B}
   if (CT) {next := T}
} while (next = B)
```

The algorithm that performs the execution of the transformation rules can be summarised as follows:

```
Graph graph := input
Set edges := graph.edges
List strategy := [Rule1, Rule2, ..., Rulen]
boolean done := false
do while(not done) {
   boolean applied := false
   for each rule in strategy {
      for each edge in edges {
         if (edge matches rule.pattern) {
            apply rule.updateOperation(edge)
            applied := true
         }
      } until (applied)
   } until (applied)
   if (edges empty or not applied) done := true
}
Set nodes := graph.nodes
if (nodes contains only one element node) {
   output := node.behavior
} else {
   output := undefined
}
```

In this pseudo-code the keywords and literals such as boolean are shown in bold to distinguish them from variables such as done, and := is used for assignments. The "for each" construct takes the next element from a List, e.g., strategy, or selects an arbitrary element from a Set, e.g., edges. The match keyword tests whether the pattern of a rule, i.e., the left side, matches, e.g., tests whether the source and target of an edge are the same node for rule L. The apply keyword applies the update operation of a rule, i.e., the right side, to the matching edge. The algorithm loops through all the rules and for one rule through all the edges until it finds a matching edge. In this case, it applies the update operation and starts again with the first rule. If the set of edges is empty, or if none of the rules can be applied to an edge anymore, the algorithm terminates.

If the graph at the end contains only one single node, the behavior of this node is the result. This is always the case if the strategy contains rule C and rule L. Strategies with only some of the rules, however, may terminate when the graph still contains edges and more than one node. In this case, the result of the transformation is undefined.

As already seen in FIG. 7, transformations based on some or all five rules are not confluent. Though the resulting programs are not equal, they are functionally equivalent. Consequently, different strategies can be used to run the transformation in order to shape the resulting program. In other words, the transformations defined by the five rules build a family of transformations, and the strategy determines the family member.

Because each step of the transformation removes at least one edge, and because models are finite and therefore may only contain a finite number of edges, the algorithm will always terminate eventually. Independent of the priorities given to the rules, the result will always be functionally equivalent to the original model.

However, the strategy, i.e., the priorities of the rules, will influence the result. If rule C has highest priority, it will be applicable as long as there are at least two nodes left in the model, because initially any node is reachable from the start node, the termination node is reachable from any node, and the update operations do not affect this. In other words, rule C will merge nodes until only a single node is left. If this node has an outgoing edge leading to itself, (i.e., a self-loop, the original model was cyclic, and a single application of rule L will remove this last remaining edge). Thus, the number of repeat-loops is minimized. If rule L has highest priority, self-loops are removed as soon as possible. Thus, the number of repeat-loops is maximized.

This data processing method functions independently of the rule selection strategy, (i.e., the priorities assigned to the rules), because different requirements lead to different strategies. The strategy can be considered as a list of rules ordered by priority (higher priority before lower priority). The list [rule L, rule C] is an example of a strategy and corresponds to the case discussed above where the number of repeat-loops is maximized. However, a strategy where rule Cst has a lower priority than rule C, rule Cs or rule Ct, will never apply rule Cst.

There are two decisions made when selecting the strategy, the subset of rules to be used, and the priorities of those rules. The first decision determines the set of flow graphs that can be transformed completely to a structured program. The second decision influences the quality of the transformation result. In general, if L has the highest priority, the resulting program contains more repeat-loops, and these loops contain only code that is part of the cycle. Therefore, the number of if-statements is minimal. If, on the other hand, L has lowest priority, the resulting program contains a lower number of repeat-loops, but unnecessary code is moved into these loops protected by if-statements to ensure that the code is only executed when necessary.

If L has the lowest priority then, if the rule-set contains Ct, this strategy has the tendency to move nodes to the right of a cycle into the loop. Similarly, if the rule-set contains Cs, nodes to the left of the cycle may get moved into the loop. Because C generalizes these two rules, nodes on both sides of the cycle are consumed before the loop is resolved. In general, rule C without the help of any other rule can transform any flow graph into a flow graph with a single node. If this node has a self-loop, the flow graph was cyclic and a single application of rule L at the end of the transformation can remove the self-loop. Otherwise, the flow graph was acyclic.

Rule-sets containing Cs and Ct not only merge nested but also overlapping cycles. Overlapping cycles result in a single loop in case the rule-set contains L, Cs, and Ct, and the strategy gives L lowest priority. Disjoint cycles, on the other hand, can only be resolved into a single loop if the rule-set contains C. A strategy to keep disjoint loops separate may thus use all rules but give Cs and Ct high, L medium and C low priority.

In addition to determining the order for which rules should be executed, the order in which the nodes of the model should be processed is also to be determined. Generally, the initial and final nodes may preferably be resolved as late as possible, because they become the initialization and implicit termination of the resulting program. Otherwise, the nodes are rather indistinguishable from the transformation's point of view, as long as only local properties of the flow graph are considered. The only distinguishing features are the number of incoming and outgoing edges of the source and target node, whether source and target node are the same, and whether source and/or target node have a self-loop.

The preconditions of the five transformation rules describe local patterns in flow graphs. To determine whether L is applicable, a pattern with a single node and a self-loop is matched. To determine whether one of the other four rules is applicable, a pattern with two distinct nodes connected through an edge and, with possibly some additional rule-specific constraints is matched.

The strategy can be further refined through additional and more complex patterns than the preconditions of the rules in the rule-set. For example, the following strategy is possible. The rule-set contains L and Ct, and Ct has the higher priority. Instead of applying L blindly, when Ct was no longer applicable, we used a pattern that preferred nodes with a self-loop and only one other incoming edge over other nodes with a self-loop. This strategy minimized the number of repeat-loops, because the node and its predecessor became applicable for Ct after removal of the self-loop.

The fact that the three rules Cs, Ct, and C have the tendency to move nodes unnecessarily into loops if rule L has lowest priority, may not always be desired. To improve this situation in particular, and to fine-tune the strategy in general, patterns involving more than an edge with its source and target node or even global properties of the flow graph may be used, though in general it is better to stay with local properties as long as possible for performance reasons.

The data processing method effectively uses a family of algorithms that allow the transformation of sequential behavioral models with unstructured continuations, for example gotos, into behavioral models with only the structured constructs for loops, for example, repeat-loops, and conditionals, such as if-statements. The algorithms can be applied to any subject that lends itself to graph reduction, such as textual models, like programming languages, in order to eliminate gotos or to graphical models, for example, business processes or workflows, in order to remove unstructured cycles. The family of algorithms is based on the two general transformation rules, L and C, and three specializations of C, called Cs, Ct, and Cst. The rule L is responsible for the introduction of structured loops by resolving gotos that go "upstream", and the rule C is responsible for the introduction of conditionals by resolving gotos that go "downstream".

A transformation algorithm, i.e., a member of this family, can be defined by selecting a subset of rules and by choosing a rule-application strategy. Depending on the rule-set selected, any source model or only some source models can be completely transformed. This has the advantage that no auxiliary methods such as node-splitting are needed in order to transform the desired set of source models.

Figure 8:
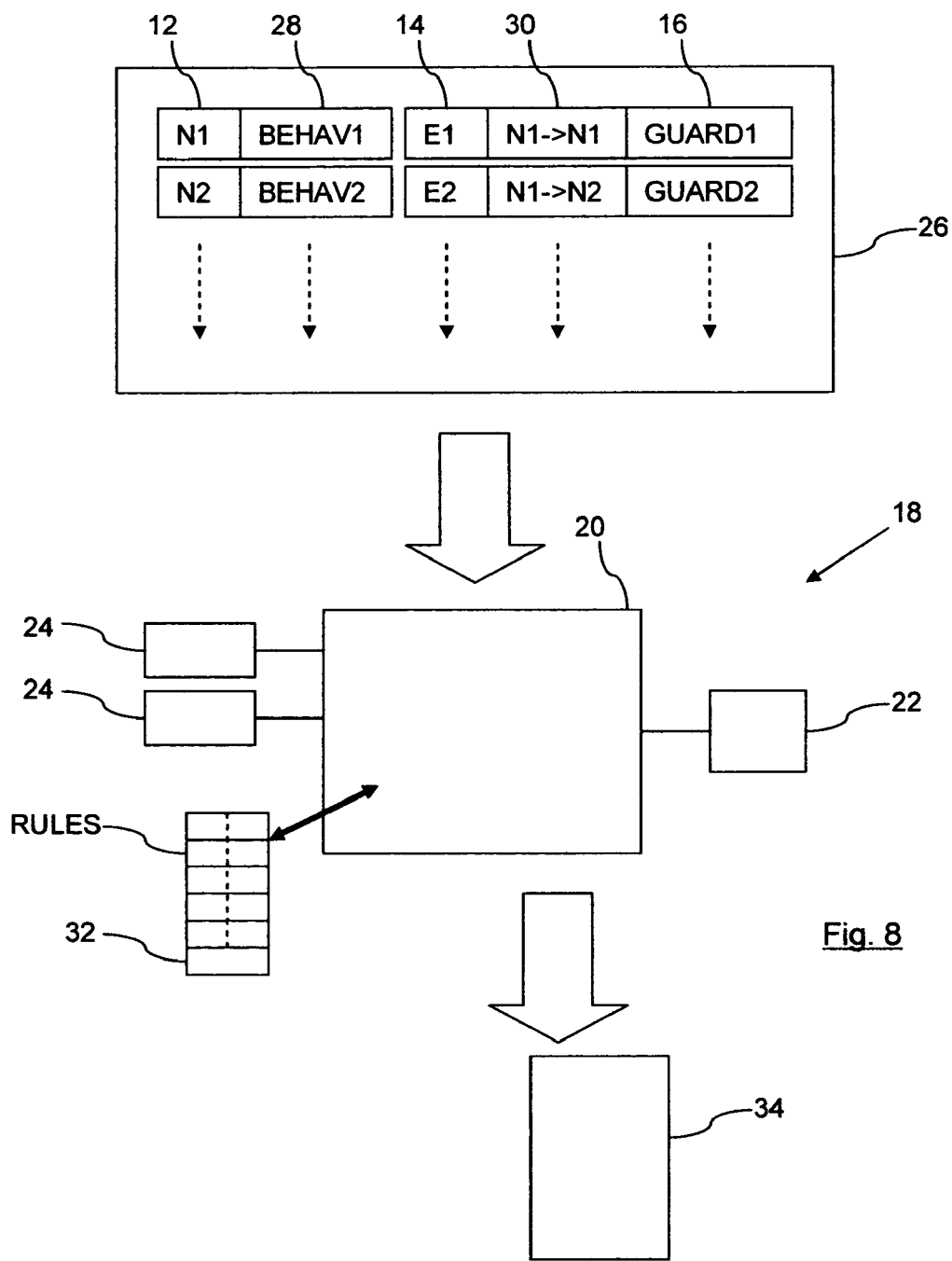
FIG. 8 shows an example of a data processing system 18 (shown schematically) that can be used to execute the data processing method.

FIG. 8 shows an example of a data processing system 18 (shown schematically) that can be used to execute the data processing method. The system comprises a processor 20, a display device 22 and user input devices 24. The processor 20 is arranged to receive a model 26 of a directed graph 10.

The model 26 defines a series of nodes 12 and edges 14 of the directed graph 10, each node 12 having a corresponding behavior 28 defining the execution of the node 12, and each edge 14 having corresponding data 30 defining a directional link from one node 12 to another node 12 and having a corresponding condition 16 defining when the edge 14 is to be traversed.

As discussed above, the processor 10 executes, according to a predefined priority 32, a series of transformation rules C, L, Cst, Cs and Ct, each rule including an update operation defining a new behavior 28 for each node affected by the elimination of the edge 14, and creates an output 34 according to the performance of the transformation rules.

The invention claimed is:

1. A data processing method for a data processing system having a processor comprising the steps of:
   receiving at said processor a model of a directed graph representing execution logic of a process flow, the model defining one or more nodes and edges of the directed graph, each node having a corresponding behavior defining execution of the node, and each edge having corresponding data defining a directional link from one node to another node and having a corresponding condition defining when the edge is to be traversed;
   said processor executing an initial transformation on the model of a directed graph by introducing a variable "next" to store a next node, Nx, to be executed and by replacing each edge condition, ci, where ci is the original guard of the edge N->Ni (for i=1 to n), with a term "if (cx) {next=Nx}", where x is (i, i+1, . . . , i+n), on the model of the directed graph to produce a transformed graph;

said processor executing a series of transformation rules on said transformed graph, according to a predefined priority for applying transformation rules, the transformation rules comprising a first rule for the elimination of an edge that links a node to itself, and a second rule for the elimination of an edge that links a node to another node, each rule including an update operation defining a new behaviour for the or each node affected by the elimination of a corresponding edge and updating edge conditions of any remaining edges to maintain the execution logic, wherein the second rule comprises at least one of a third rule for the elimination of an edge that links a source node to a target node, if and only if the source node has only one outgoing edge and the target node has only one incoming edge, a fourth rule for the elimination of an edge that links a source node to a target node, if and only if the source node has only one outgoing edge, and a fifth rule for the elimination of an edge that links a source node to a target node, if and only if the target node has only one incoming edge; and said processor creating an output according to the performance of the transformation rules.

2. A method according to claim 1, wherein the output comprises a new model of a directed graph, the model comprising a single node and corresponding behaviour.

3. A method according to claim 1, further comprising determining a data processing strategy for the model of the directed graph, the determining comprising steps of said processor:

selecting a set or subset of transformation rules to be applied; and defining a priority order for applying the transformation rules, wherein rule selection determines a set of flow graphs that can be transformed completely to a structured graph and wherein the priority order affects quality of the output of the data processing method.

4. A method according to claim 1, wherein the output of the data processing method is structured as a graphical representation in a different format from that of the received model.

5. A method according to claim 1, wherein the transformation rules comprise two portions, a first portion defining a pattern, and a second portion defining the update operation.

6. A method according to claim 1, wherein predefined priority for rule execution comprises, in order, third rule, fourth rule, fifth rule, second rule, first rule.

7. A method according to claim 1, and further comprising receiving a user input, the user input defining a predefined priority of the rules.

8. A data processing system comprising a processor, a display device and one or more user input devices, the data processing system with processor comprising:

a receiving component to receive a model of a directed graph representing execution logic of a process flow, the model defining one or more nodes and edges of the directed graph, each node having a corresponding behavior defining execution of the node, and each edge having corresponding data defining a directional link from one node to another node and having a corresponding condition defining when the edge is to be traversed;

an execution component at said processor to execute an initial transformation on the model of a directed graph by introducing a variable "next" to store a next node to be executed, Nx, and by replacing each edge condition, $c_i$, where $c_i$ is the original guard of the edge N->Ni (for i=1 to n), with a term "if (cx) {next=Nx}", where x is (i, i+1, . . . , i+n), on the model of the directed graph to produce a transformed graph, and to execute, according to a predefined priority, a series of transformation rules on the transformed graph, the transformation rules comprising a first rule for the elimination of an edge that links a node to itself, and a second rule for the elimination of an edge that links a node to another node, each rule including an update operation defining a new behaviour for the or each node affected by elimination of the edge and updating edge conditions of any remaining edges to maintain the execution logic, wherein the second rule comprises at least one of a third rule for the elimination of an edge that links a source node to a target node, if and only if the source node has only one outgoing edge and the target node has only one incoming edge, a fourth rule for the elimination of an edge that links a source node to a target node, if and only if the source node has only one outgoing edge, and a fifth rule for the elimination of an edge that links a source node to a target node, if and only if the target node has only one incoming edge; and an output component to create an output from said data processing system according to the performance of the transformation rules.

9. A system according to claim 8, wherein the output comprises a new model of a directed graph, the model comprising a single node and corresponding behaviour.

10. A system according to claim 8, wherein the execution component determines a data processing strategy for the model of the directed graph, the determining comprising:

selecting a set or subset of transformation rules to be applied; and defining a priority order for applying the transformation rules, wherein rule selection determines a set of flow graphs that can be transformed completely to a structured graph and wherein the priority order affects quality of the output of the data processing method.

11. A system according to claim 8, wherein the output is structured as a graphical representation in a different format from that of the received model.

12. A system according to claim 8, wherein the transformation rules comprise two portions, a first portion defining a pattern, and a second portion defining the update operation.

13. A system according to claim 8, wherein the predefined priority comprises, in order, third rule, fourth rule, fifth rule, second rule, first rule.

14. A system according to claim 8, wherein a user input device is arranged to receive a user input, the user input defining the predefined priority of the rules.

15. A computer program product, on a computer readable medium, for operating a data processing system having a processor, comprising instructions for performing the steps of:

receiving at said processor a model of a directed graph representing execution logic of a process flow, the model defining one or more nodes and edges of the directed graph, each node having a corresponding behavior defining execution of the node, and each edge having corresponding data defining a directional link from one node to another node and having a corresponding condition defining when the edge is to be traversed;

said processor executing an initial transformation on the model of a directed graph by introducing a variable "next" to store a next node to be executed, Nx, and by replacing each edge condition, ci, where ci is the original guard of the edge N->Ni (for i=1 to n) with a term "if(cx) {next=Nx}", where x is (i, i+1, ..., i+n), on the model of the directed graph to produce a transformed graph;

said processor executing, according to a predefined priority, a series of transformation rules on said transformed graph, the transformation rules comprising a first rule for the elimination of an edge that links a node to itself, and a second rule for the elimination of an edge that links a node to another node, each rule including an update operation defining a new behaviour for the or each node affected by the elimination of a corresponding edge and updating edge conditions of any remaining edges to maintain the execution logic, wherein the second rule comprises at least one of a third rule for the elimination of an edge that links a source node to a target node, if and only if the source node has only one outgoing edge and the target node has only one incoming edge, a fourth rule for the elimination of an edge that links a source node to a target node, if and only if the source node has only one outgoing edge, and a fifth rule for the elimination of an edge that links a source node to a target node, if and only if the target node has only one incoming edge; and said processor creating an output according to the performance of the transformation rules.

* * * * *